(12) United States Patent
Oh et al.

(10) Patent No.: US 9,355,780 B2
(45) Date of Patent: *May 31, 2016

(54) MULTILAYER CERAMIC CAPACITOR, AND CIRCUIT BOARD HAVING MULTILAYER CERAMIC CAPACITOR EMBEDDED THEREIN

(71) Applicant: SAMSUNG ELECTRO-MECHANICS CO., LTD., Suwon, Gyunggi-do (KR)

(72) Inventors: Deok Seok Oh, Gyunggi-do (KR); Jung Hyun Jeon, Gyunggi-do (KR)

(73) Assignee: SAMSUNG ELECTRO-MECHANICS CO., LTD., Suwon-Si, Gyeonggi-Do (KR)

(*) Notice: Subject to any disclaimer, the term of this patent is extended or adjusted under 35 U.S.C. 154(b) by 246 days.

This patent is subject to a terminal disclaimer.

(21) Appl. No.: 13/928,163

(22) Filed: Jun. 26, 2013

(65) Prior Publication Data

US 2014/0209363 A1     Jul. 31, 2014

(30) Foreign Application Priority Data

Jan. 29, 2013   (KR) ................... 10-2013-0009881

(51) Int. Cl.
*H01G 4/30* (2006.01)
*B24B 31/02* (2006.01)
*H01G 4/12* (2006.01)
*H01G 4/232* (2006.01)

(52) U.S. Cl.
CPC .............. *H01G 4/30* (2013.01); *B24B 31/0218* (2013.01); *H01G 4/12* (2013.01); *H01G 4/232* (2013.01); *Y10T 29/43* (2015.01)

(58) Field of Classification Search
CPC ....................................................... H01G 4/30
USPC ............................... 361/311, 301.4; 29/25.42
See application file for complete search history.

(56) References Cited

U.S. PATENT DOCUMENTS

| | | | |
|---|---|---|---|
| 5,805,409 A * | 9/1998 | Takahara et al. | 361/303 |
| 6,431,956 B1 | 8/2002 | Otsuka | |
| 2009/0231779 A1* | 9/2009 | Aoki | 361/301.4 |
| 2011/0019334 A1* | 1/2011 | Nishigaki et al. | 361/301.4 |
| 2011/0266040 A1* | 11/2011 | Kim et al. | 174/260 |
| 2012/0075766 A1* | 3/2012 | Nishioka | H01G 4/30 361/301.4 |
| 2012/0194031 A1 | 8/2012 | Ogawa et al. | |

(Continued)

FOREIGN PATENT DOCUMENTS

| | | |
|---|---|---|
| CN | 102623178 A | 8/2012 |
| JP | 2001-076964 A | 3/2001 |

(Continued)

OTHER PUBLICATIONS

Examination Report dated Nov. 19, 2014 issued in the corresponding Taiwanese Patent Application No. 102121485 (English translation).

(Continued)

*Primary Examiner* — Eric Thomas
(74) *Attorney, Agent, or Firm* — McDermott Will & Emery LLP

(57) ABSTRACT

There are provided multilayer ceramic capacitor, a manufacturing method therefor, a circuit board having a multilayer ceramic capacitor embedded therein, and a polishing device for a multilayer ceramic capacitor.

7 Claims, 4 Drawing Sheets

(56) References Cited

U.S. PATENT DOCUMENTS

| | | |
|---|---|---|
| 2012/0229949 A1 | 9/2012 | Kim |
| 2012/0268859 A1 | 10/2012 | Chung et al. |
| 2012/0293908 A1* | 11/2012 | Koga et al. ................ 361/301.4 |
| 2013/0222972 A1 | 8/2013 | Saito et al. |

FOREIGN PATENT DOCUMENTS

| | | |
|---|---|---|
| JP | 2006-310700 A | 11/2006 |
| JP | 2011-151148 A | 8/2011 |
| KR | 2009-0083568 A | 8/2009 |
| WO | 2012/077585 A1 | 6/2012 |

OTHER PUBLICATIONS

Japanese Office Action issued in corresponding Japanese Application No. 2013-132408, dated Jun. 3, 2014, with English translation.

Chinese Office Action mailed in corresponding Chinese Patent Application No. 201310291733.0, mailed on Apr. 1, 2016.

\* cited by examiner

X – X'

MULTILAYER CERAMIC CAPACITOR, AND CIRCUIT BOARD HAVING MULTILAYER CERAMIC CAPACITOR EMBEDDED THEREIN

CROSS-REFERENCE TO RELATED APPLICATIONS

This application claims the priority of Korean Patent Application No. 10-2013-0009881 filed on Jan. 29, 2013, in the Korean Intellectual Property Office, the disclosure of which is incorporated herein by reference.

BACKGROUND OF THE INVENTION

1. Field of the Invention

The present invention relates to a multilayer ceramic capacitor, a manufacturing method therefor, a circuit board having a multilayer ceramic capacitor embedded therein, and a polishing device for a multilayer ceramic capacitor.

2. Description of the Related Art

In accordance with high densification and high integration of electronic circuits, mounting spaces for passive devices on printed circuit boards have become insufficient. In order to solve this problem, efforts aimed at implementing a component to be embedded in a circuit board, that is, an embedded device, have been undertaken. Particularly, methods of embedding a multilayer ceramic capacitor used as a capacitive component in the board have been variously suggested.

As a method of embedding the multilayer ceramic capacitor in the board, there is provided a method of using a dielectric material for a multilayer ceramic electronic component as a material of the board and using copper wiring, or the like, as an electrode for the multilayer ceramic electronic component. In addition, as another method of implementing a multilayer ceramic capacitor to be embedded in the board, there is provided a method of forming a high-k polymer sheet or a dielectric thin film in the board to form a board-embedded multilayer ceramic capacitor and a method of embedding a multilayer ceramic capacitor in the board.

Generally, a multilayer ceramic capacitor includes a plurality of dielectric layers formed of a ceramic material and internal electrodes interposed therebetween. The multilayer ceramic electronic component as described above is positioned within the board, such that a multilayer ceramic capacitor to be embedded in the board and having high capacitance may be implemented.

However, in the case of the multilayer ceramic capacitor to be embedded in the board, the multilayer ceramic capacitor has a smaller thickness than a length and a width thereof in order to be easily embedded. Generally, in order to prevent a chipping defect occurring when ceramic bodies impact each other to be broken in a manufacturing process, edge and vertex portions of the ceramic body should be polished. However, in the case of the ceramic body having a thin thickness, it may not be easy to polish the ceramic body, and non-uniform polishing may occur. Further, in the case in which the polishing is excessively or insufficiently performed, reliability of the multilayer ceramic electronic component may be affected.

Therefore, optimized dimensions for polishing the multilayer ceramic electronic component, and a method for polishing the multilayer ceramic electronic component have been required.

RELATED ART DOCUMENT (Patent Document 1) Japanese Patent Laid-Open Publication No. 2006-310700
(Patent Document 2) Korean Patent Laid-Open Publication No. 2009-0083568

SUMMARY OF THE INVENTION

An aspect of the present invention provides a multilayer ceramic capacitor, a manufacturing method therefor, a circuit board having a multilayer ceramic capacitor embedded therein, and a polishing device for a multilayer ceramic capacitor.

According to an aspect of the present invention, there is provided a multilayer ceramic capacitor including: a 1005-sized ceramic body including a dielectric layer and a cover layer; first and second internal electrodes disposed to face each other, while having the dielectric layer interposed therebetween; and a first external electrode electrically connected to the first internal electrode and a second external electrode electrically connected to the second internal electrode, wherein in a length-thickness (L-T) cross-section of the ceramic body, in the case in which a square is defined as including sides parallel to a central portion of a first main surface of the ceramic body, and vertices disposed in a diagonal direction on outer surfaces of the ceramic body, the sides having a length of 30 µm, when an area of a region of the square not occupied by the ceramic body is defined as A-out and a thickness of the cover layer is defined as t, the following Equations are satisfied: $9\ \mu m^2 \le A\text{-out}$ and $A\text{-out}/t \le 3.7\ \mu m$.

The ceramic body may have a thickness of 0.09 mm or less after firing.

The cover layer may include upper and lower cover layers, and the thickness t of the cover layers may be an average of thicknesses of the upper and lower cover layers.

According to another aspect of the present invention, there is provided a circuit board having a multilayer ceramic capacitor embedded therein, the circuit board including: a circuit board part provided with a groove for receiving an electronic component; and a multilayer ceramic capacitor including a 1005-sized ceramic body including a dielectric layer and a cover layer; first and second internal electrodes disposed to face each other, while having the dielectric layer interposed therebetween; and a first external electrode electrically connected to the first internal electrode and a second external electrode electrically connected to the second internal electrode, and disposed in the groove, wherein in a length-thickness (L-T) cross-section of the ceramic body, in the case in which a square is defined as including sides parallel to a central portion of a first main surface of the ceramic body, and vertices disposed in a diagonal direction on outer surfaces of the ceramic body, the sides having a length of 30 µm, when an area of a region of the square not occupied by the ceramic body is defined as A-out and a thickness of the cover layer is defined as t, the following Equations are satisfied: $9\ \mu m^2 \le A\text{-out}$ and $A\text{-out}/t \le 3.7\ \mu m$.

According to another aspect of the present invention, there is provided a manufacturing method for a multilayer ceramic capacitor, the manufacturing method including: preparing ceramic green sheets; forming internal electrode patterns on the ceramic green sheets using a conductive paste for an internal electrode; forming a 1005-sized ceramic body including first and second internal electrodes disposed to face each other, a dielectric layer, and a cover layer therein, by stacking the ceramic green sheets having the internal electrode patterns formed thereon and the ceramic green sheets having no internal electrode patterns formed thereon, and then firing the stacked ceramic green sheets; polishing edges of the ceramic body; and forming a first external electrode electrically connected to the first internal electrode and a second external electrode electrically connected to the second internal electrode, wherein in a length-thickness (L-T) cross-section of the ceramic body, in the case in which a square is defined as including sides parallel to a central portion of a first main surface of the ceramic body, and vertices disposed in a diagonal direction on outer surfaces of the ceramic body, the sides having a length of 30 μm, when an area of a region of the square not occupied by the ceramic body is defined as A-out and a thickness of the cover layer is defined as t, the following Equations are satisfied: 9 μm² ≤ A-out and A-out/t ≤ 3.7 μm.

The ceramic body may have a thickness of 0.09 mm or less after firing.

The cover layer may include upper and lower cover layers, and the thickness t of the cover layers may be an average of thicknesses of the upper and lower cover layers.

According to another aspect of the present invention, there is provided a polishing device including: a revolving table having a rotation axis in a direction perpendicular to a direction of gravity; a polishing tank disposed on a surface of the revolving table, having a rotation axis in the direction perpendicular to the direction of gravity, and including a 1005-sized ceramic body and a polishing element introduced therein; a polishing tank rotation controlling part controlling rotation of the polishing tank; and a revolving table rotation controlling part controlling rotation of the revolving table, wherein the rotation axes of the polishing tank and the revolving table are formed at different positions to be in parallel to each other.

When the rotation of the polishing tank is defined as rotation and the rotation of the revolving table is defined as revolution, rotational speed/revolution speed may be a rational number rather than an integer.

The 1005-sized ceramic body may include a dielectric layer and a cover layer and have a thickness of 0.09 mm or less after firing.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
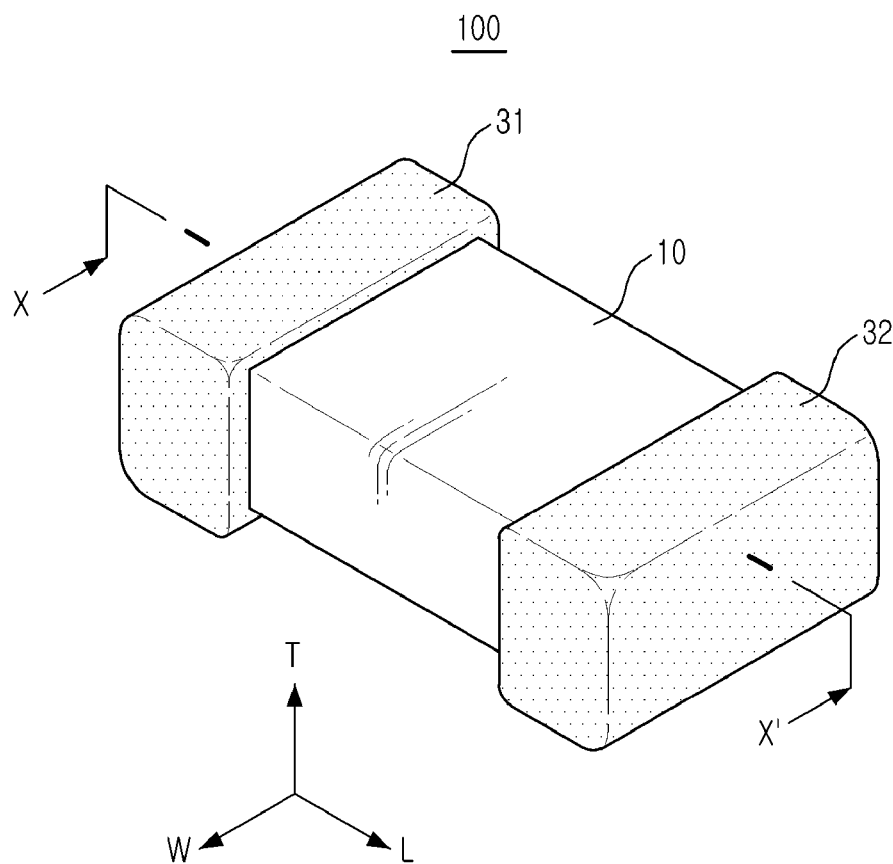
FIG. 1 is a perspective view showing a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Multilayer Ceramic Capacitor 100

FIG. 1 is a perspective view showing a multilayer ceramic capacitor 100 according to an embodiment of the present invention.

Figure 2:
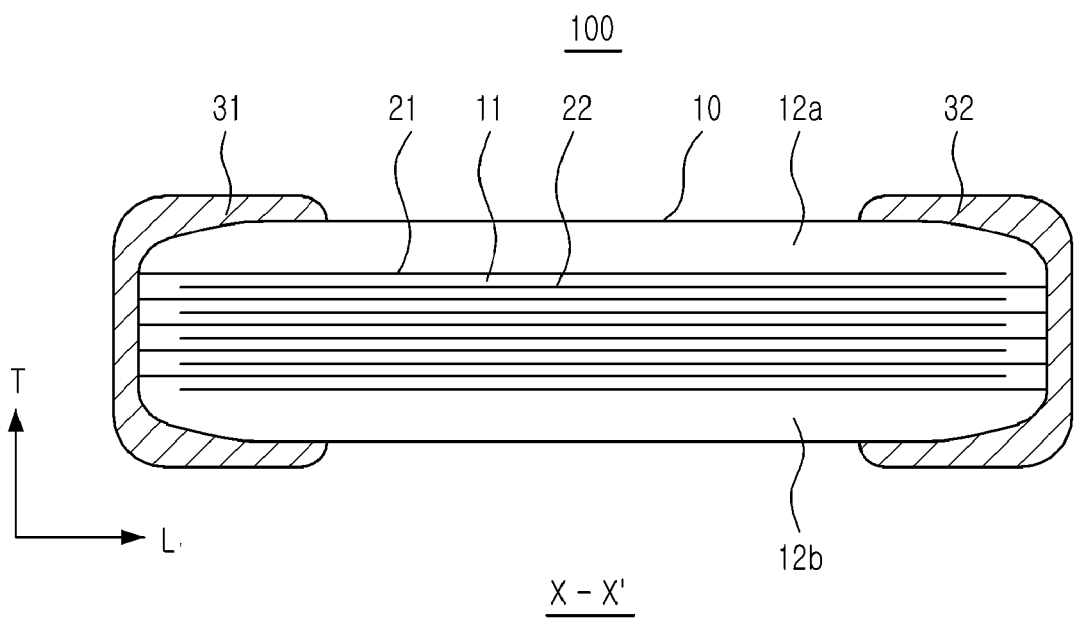
FIG. 2 is a cross-sectional view taken along line X-X' of FIG. 1.

FIG. 2 is a cross-sectional view taken along line X-X' of FIG. 1.

Referring to FIGS. 1 and 2, the multilayer ceramic capacitor to be embedded in a board according to the embodiment of the present invention may include a ceramic body 10; and first and second external electrodes 31 and 32.

The ceramic body 10 may include an active layer as a part contributing to forming capacitance in the capacitor and upper and lower cover layers 12a and 12b formed on upper and lower portions of the active layer as upper and lower margin parts. The active layer may include dielectric layers 11 and internal electrodes 21 and 22, and in this case, the internal electrodes 21 and 22 may be a plurality of first and second internal electrodes 21 and 22 alternately formed, while having each dielectric layer 11 interposed therebetween.

In the embodiment of the present invention, a shape of the ceramic body 10 is not particularly limited, but may be substantially hexahedral. A difference in thickness is generated according to the firing shrinkage of ceramic powder at the time of firing a chip and the presence or absence of an internal electrode pattern, and edge portions of the ceramic body are polished, such that the ceramic body 10 does not have a perfect hexahedral shape but may have a shape substantially close to a hexahedral shape.

Directions of a hexahedron will be defined in order to clearly describe the embodiments of the present invention. L, W and T shown in the accompanying drawings refer to a length direction, a width direction, and a thickness direction, respectively. Here, the thickness direction may be the same as a direction in which dielectric layers are stacked.

Further, in the embodiment of the present invention, for convenience of explanation, two surfaces opposing each other in the thickness direction of the ceramic body are defined as first and second main surfaces 1 and 2, two surfaces opposing each other in the width direction thereof are defined as first and second side surfaces 3 and 4, and two surfaces opposing each other in the length direction thereof are defined as first and second end surfaces 5 and 6.

The ceramic body may have a thickness of 0.09 mm or less and a 1005 size after firing. A 1005-sized ceramic body refers to a ceramic body having a length (a length in the L direction) of 0.95 mm±0.05 mm and a width (a width in the W direction) of 0.47 mm±0.05 mm after firing.

The internal electrodes 21 and 22 may include the first and second internal electrodes 21 and 22 disposed to face each other, while having each dielectric layer 11 interposed therebetween. The first and second internal electrodes 21 and 22, a pair of electrodes having different polarities from each other, may be formed by printing a conductive paste containing a conductive metal on the dielectric layer 11 at a predetermined thickness to be alternately exposed to both end surfaces of the ceramic body in the direction in which the dielectric layers 11 are stacked, and may be electrically insulated from each other by the dielectric layer 11 interposed therebetween.

That is, the first and second internal electrodes 21 and 22 may be electrically connected to the first and second external electrodes 31 and 32 through portions thereof alternately exposed to both end surfaces of the ceramic body 10, respectively.

Therefore, when voltage is applied to the first and second external electrodes 31 and 32, electric charges are accumulated between the first and second internal electrodes 21 and 22 facing each other. In this case, the capacitance of the multilayer ceramic capacitor 100 may be in proportion to an area of an overlapped region between the first and second internal electrodes 21 and 22.

A thickness of the first and second internal electrodes 21 and 22 as described above may be determined according to the use thereof. For example, the thickness may be determined to be within a range of 0.2 to 1.0 μm in consideration of the size of the ceramic body 10, but the present invention is not limited thereto.

Further, the conductive metal contained in the first and second internal electrodes 21 and 22 may be nickel (Ni), copper (Cu), palladium (Pd), or an alloy thereof, but the present invention is not limited thereto.

In this case, a thickness of the dielectric layer 11 may be optionally changed according to the intended capacitance design of the multilayer ceramic capacitor, but a thickness of a single layer may be 0.1 to 10 μm after firing. However, the present invention is not limited thereto.

Further, the dielectric layer 11 may contain a ceramic powder having a high degree of permittivity, for example, a barium titanate ($BaTiO_3$)-based powder or a strontium titanate ($SrTiO_3$)-based powder, or the like, but the present invention is not limited thereto.

The upper and lower cover layers 12a and 12b may have the same material and configuration as those of the dielectric layer 11, except that internal electrodes are not included therein. The upper and lower cover layers may be formed by stacking at least one dielectric layer on upper and lower surfaces of the active layer in a vertical direction, respectively, and generally serve to prevent the first and second internal electrodes 21 and 22 from being damaged by physical or chemical stress.

The first external electrode 31 may be electrically connected to the first internal electrode 21, and the second external electrode 32 may be electrically connected to the second internal electrode 22. The first and second external electrodes 31 and 32 may contain a conductive metal, and the conductive metal may be nickel (Ni), copper (Cu), palladium (Pd), gold (Au), or an alloy thereof, but the present invention is not limited thereto.

Hereinafter, a relationship between a chipping defect according to the dimensions of the ceramic body 10 of the multilayer ceramic capacitor according to the embodiment of the present invention and capacitance thereof will be described.

Figure 3:
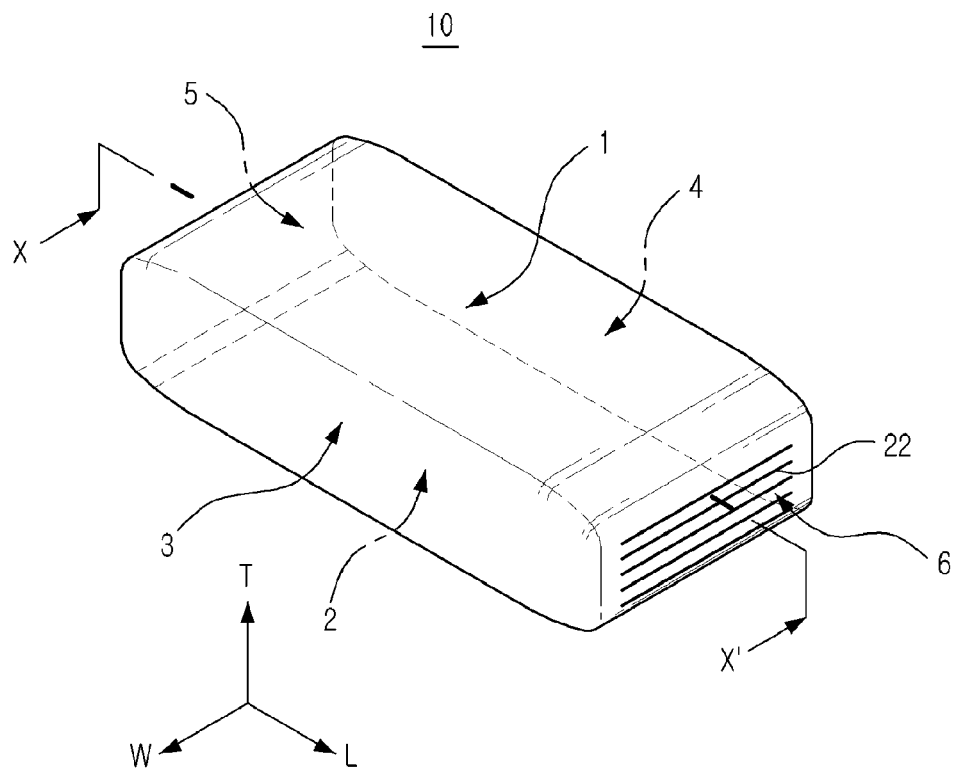
FIG. 3 is a perspective view showing a ceramic body of the multilayer ceramic capacitor according to the embodiment of the present invention.
Figure 4:
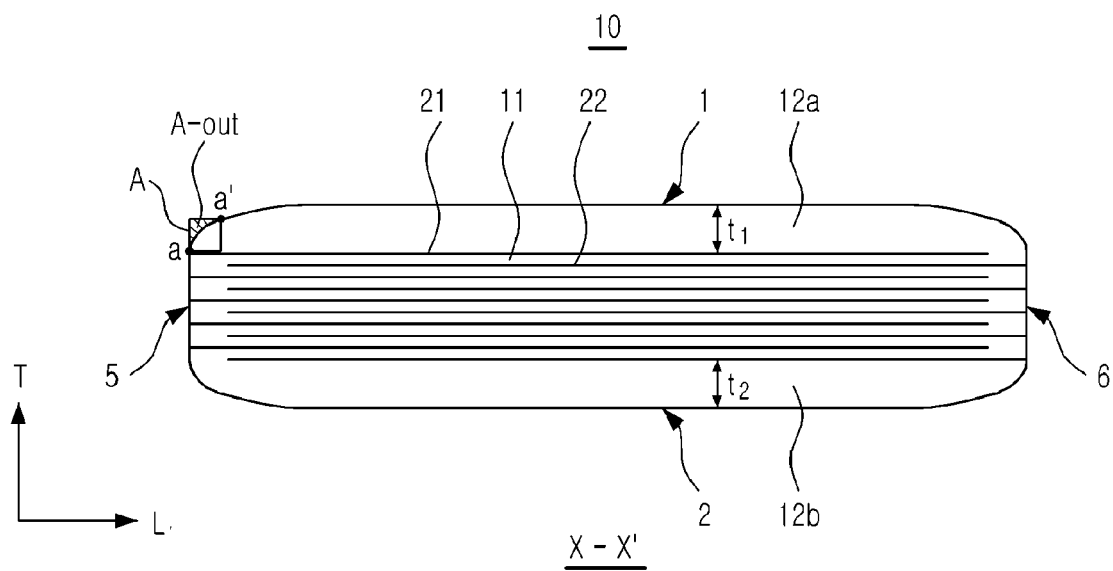
FIG. 4 is a cross-sectional view taken along line X-X' of FIG. 3.

FIG. 3 is a perspective view showing the ceramic body 10 of the multilayer ceramic capacitor according to the embodiment of the present invention, and FIG. 4 is a cross-sectional view taken along line X-X' of FIG. 3.

Referring to FIG. 4, a thickness of the upper cover layer is defined as $t_1$, and a thickness of the lower cover layer is defined as $t_2$. Further, in a length-thickness (L-T) cross-section of the ceramic body, a square A is defined as including sides parallel to a central portion of the first main surface of the ceramic body and vertices a and a' disposed in a diagonal direction on outer surfaces of the ceramic body, the sides having a length of 30 μm, an area of a region of the square not occupied by the ceramic body is defined as A-out; and an average of thicknesses of the lower and upper cover layers is defined as t.

The central portion of the first main surface refers to a region extended by 10 μm from a midpoint of the first main surface of the ceramic body towards ends thereof in the length direction.

Here, the thickness of the upper cover layer 12a refers to a distance from a midpoint of the first main surface 1 of the ceramic body in the length and width directions to the first internal electrode 21 formed on the uppermost portion of the active layer in the thickness direction, and the thickness of the lower cover layer 12b refers to a distance from a midpoint of the second main surface 2 of the ceramic body in the length and width directions to the second internal electrode 22 formed on the lowermost portion of the active layer in the thickness direction. In this case, t is an average of $t_1$ and $t_2$ ($t=(t_1+t_2)/2$).

In the ceramic body 10 having brittleness after firing, chipping defects occurring when ceramic bodies impact each other to thereby be broken in a transfer process during manufacturing of the multilayer ceramic capacitor are frequently generated. Therefore, in order to solve the chipping defects, predetermined portions of the vertices and edges of the ceramic body may be polished to have smoothly curved shapes.

In the case in which the vertices and the edges of the ceramic body are not polished to a predetermined level or more, chipping defects may be generated, while in the case in which the vertices and the edges of the ceramic body are excessively polished, a thickness of a cover layer adjacent to the edges of the ceramic body may be thin, such that oxidation of the internal electrodes 21 and 22 is not prevented, and the outermost internal electrodes are oxidized, thereby decreasing capacitance. In order to prevent chipping defects and decreases in capacitance, the ceramic body may be polished to satisfy the following Equations: 9 μm$^2$≤A-out and A-out/t≤3.7 μm.

In the 1005-sized ceramic body having the thickness of 0.09 mm or less after firing, when A-out is less than 9 μm$^2$, chipping defects may be frequently generated, and when A-out/t exceeds 3.7 μm, a capacitance defect in which capacitance is decreased due to the oxidation of the internal electrodes may be generated.

Therefore, the ceramic body may satisfy the following Equations: 9 μm$^2$≤A-out and A-out/t≤3.7 μm.

Experimental Example

Multilayer ceramic capacitors according to Inventive Examples and Comparative Examples were manufactured as follows.

Slurry containing powder such as barium titanate ($BaTiO_3$), or the like, was applied to carrier films and dried to prepare a plurality of ceramic green sheets having a thickness of 1.5 μm.

Next, a conductive paste for a nickel internal electrode was applied to the respective ceramic green sheets using a screen printing process to form internal electrodes.

About 50 ceramic green sheets were stacked, but about 20 ceramic green sheets on which the internal electrodes were not formed on upper and lower portions thereof were stacked. Isostatic pressing was performed on the stacked body at a temperature of 85° C. and a pressure of 1000 kgf/cm$^2$.

The ceramic stacked body which has undergone the pressing was cut into individual chips, and the cut chips were de-bound by being maintained at 230° C. for 60 hours under an air atmosphere.

Then, the ceramic stacked body was fired at 1200° C. under a reduction atmosphere having an oxygen partial pressure of $10^{-11}$ atm to $-10^{-10}$ atm lower than an Ni—NiO equilibrium oxygen partial pressure, in such a manner that the internal electrodes were not oxidized. A chip size of the multilayer chip capacitor after firing was about 0.95 mm×0.47 mm (Length×Width (L×W), 1005 size). In this case, a manufacturing tolerance for length×width (L×W) was determined to be in a range of ±0.05 mm. When the manufacturing tolerance satisfied the above-mentioned range, the multilayer chip capacitor was polished, and then chipping defects and capacitance defects generated due to a decrease in capacitance were measured.

Among 1000 multilayer chip capacitors, in the case in which the number of multilayer chip capacitors having actual capacitance lower than 90% of designed capacitance was 20 or more, the case was defined as having capacitance defects (○), and in the case in which the number of multilayer chip capacitors having actual capacitance lower than 90% of the designed capacitance was less than 20, the case was defined as being a normal case (X).

The polishing was performed using a polishing device to be described below, and revolutions per minute (RPM) was measured based on a rotational speed of a revolving table.

Thereafter, a process of forming external electrodes was performed to manufacture a multilayer ceramic capacitor.

TABLE 1

| Sample | Cover thickness t (μm) | Revolutions per minute (RPM) | Time (min) | A-out (μm²) | A-out/ t (μm) | Chipping defects | Capacitance defects |
|---|---|---|---|---|---|---|---|
| 1* | 10 | 60 | 100 | 6 | 0.6 | 341/1000 | x |
| 2* | 10 | 60 | 150 | 8 | 0.8 | 106/1000 | x |
| 3 | 10 | 60 | 200 | 10 | 1 | 0/1000 | x |
| 4 | 10 | 60 | 300 | 12 | 1.2 | 0/1000 | x |
| 5* | 10 | 80 | 100 | 8 | 0.8 | 113/1000 | x |
| 6 | 10 | 80 | 150 | 13 | 1.3 | 0/1000 | x |
| 7 | 10 | 80 | 200 | 15 | 1.5 | 0/1000 | x |
| 8 | 10 | 80 | 300 | 19 | 1.9 | 0/1000 | x |
| 9 | 10 | 100 | 100 | 11 | 1.1 | 0/1000 | x |
| 10 | 10 | 100 | 150 | 20 | 2. | 0/1000 | x |
| 11 | 10 | 100 | 200 | 37 | 3.7 | 0/1000 | x |
| 12* | 10 | 100 | 300 | 39 | 3.9 | 0/1000 | ○ |
| 13 | 20 | 100 | 100 | 11 | 0.55 | 0/1000 | x |
| 14 | 20 | 100 | 150 | 19 | 0.95 | 0/1000 | x |
| 15 | 20 | 100 | 200 | 28 | 1.4 | 0/1000 | x |
| 16 | 20 | 100 | 300 | 33 | 1.65 | 0/1000 | x |
| 17 | 20 | 150 | 100 | 14 | 0.7 | 0/1000 | x |
| 18 | 20 | 150 | 150 | 23 | 1.15 | 0/1000 | x |
| 19 | 20 | 150 | 200 | 38 | 1.9 | 0/1000 | x |
| 20 | 20 | 150 | 300 | 52 | 2.6 | 0/1000 | x |
| 21 | 20 | 200 | 100 | 22 | 1.1 | 0/1000 | x |
| 22 | 20 | 200 | 150 | 40 | 2 | 0/1000 | x |
| 23 | 20 | 200 | 200 | 64 | 3.2 | 0/1000 | x |
| 24 | 20 | 200 | 300 | 74 | 3.7 | 0/1000 | x |
| 25 | 30 | 100 | 100 | 15 | 0.5 | 0/1000 | x |
| 26 | 30 | 100 | 150 | 37 | 1.233 | 0/1000 | x |
| 27 | 30 | 100 | 200 | 51 | 1.7 | 0/1000 | x |
| 28 | 30 | 100 | 300 | 62 | 2.067 | 0/1000 | x |
| 29 | 30 | 150 | 100 | 25 | 0.833 | 0/1000 | x |
| 30 | 30 | 150 | 150 | 53 | 1.767 | 0/1000 | x |
| 31 | 30 | 150 | 200 | 82 | 2.733 | 0/1000 | x |
| 32 | 30 | 150 | 300 | 93 | 3.1 | 0/1000 | x |
| 33 | 30 | 200 | 100 | 35 | 1.167 | 0/1000 | x |
| 34 | 30 | 200 | 150 | 64 | 2.133 | 0/1000 | x |
| 35 | 30 | 200 | 200 | 91 | 3.033 | 0/1000 | x |
| 36* | 30 | 200 | 300 | 112 | 3.733 | 0/1000 | ○ |

*indicates a Comparative Example.

* indicated a Comparative Example.

As shown in Table 1, it may be appreciated that in samples 1, 2, and 5 in which A-out was less than 9 μm², chipping defects was significantly generated, but in the case in which A-out was 9 μm² or more, chipping defects were not generated at all.

Further, in samples 12 and 36 in which A-out/t exceeds 3.7 μm, capacitance defects were generated due to oxidation of distal ends of the outermost internal electrodes, but in the case in which A-out/t was 3.7 μm or less, capacitance defects were not generated.

Therefore, it may be appreciated through the Experimental Example that it is preferable that the ceramic body may satisfy the following Equations: 9 μm²≤A-out and A-out/t≤3.7 μm.

According to the embodiment of the present invention, the multilayer ceramic capacitor to which the optimized dimensions for polishing the ceramic body may be applied in order to prevent chipping defects in which the ceramic body is damaged due to impacts between the ceramic bodies or between the ceramic body and other components and decrease capacitance defects due to the decrease in capacitance may be provided.

Circuit Board 200 Having Multilayer Ceramic Capacitor Embedded Therein

Figure 5:
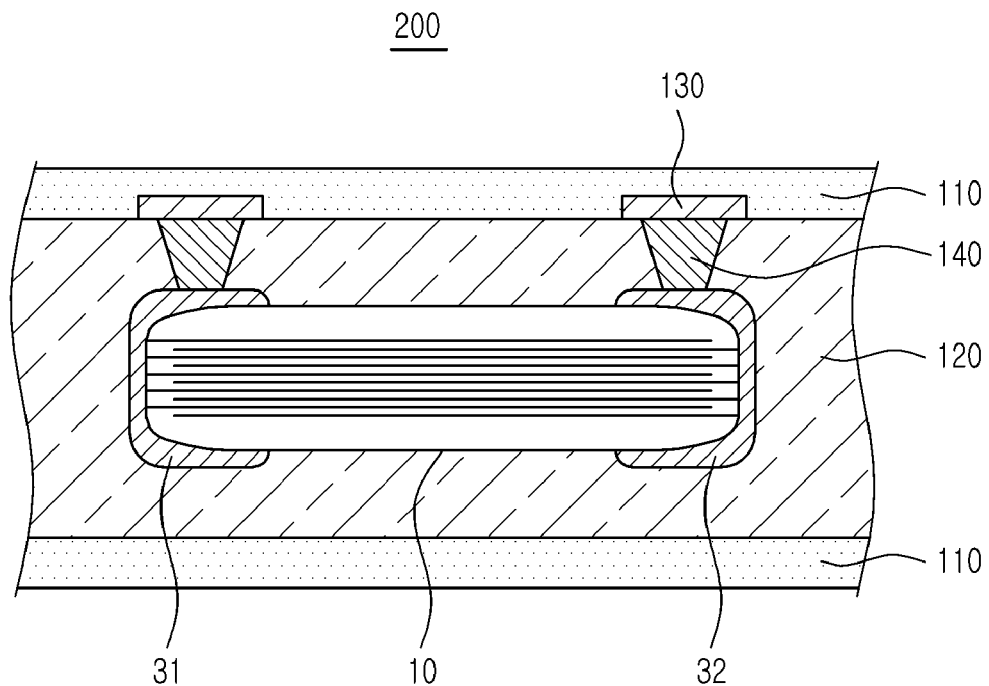
FIG. 5 is a cross-sectional view showing a circuit board having a multilayer ceramic capacitor embedded therein according to an embodiment of the present invention.

FIG. 5 is a cross-sectional view showing a circuit board 200 having a multilayer ceramic capacitor embedded therein according to an embodiment of the present invention.

Referring to FIG. 5, the circuit board 200 having a multilayer ceramic capacitor embedded therein may include a circuit board part 110 provided with a groove for receiving an electronic component; and a multilayer ceramic capacitor including a 1005-sized ceramic body 10 including a dielectric layer and a cover layer, first and second internal electrodes disposed to face each other, while having the dielectric layer interposed therebetween, and a first external electrode electrically connected to the first internal electrode and a second external electrode electrically connected to the second internal electrode, and disposed in the groove, wherein in a length-thickness (L-T) cross-section of the ceramic body, in the case in which a square is defined as including sides parallel to the central portion of the first main surface of the ceramic body, and vertices disposed in a diagonal direction on outer surfaces of the ceramic body, the sides having a length of 30 μm, when an area of a region of the square not occupied by the ceramic body is defined as A-out and a thickness of the cover layer is defined as t, the following Equations are satisfied: 9 μm²≤A-out and A-out/t≤3.7 μm.

Among descriptions of the circuit board having a multilayer ceramic capacitor embedded therein according to the present embodiment, descriptions overlapped with those of the above-mentioned multilayer ceramic capacitor will be omitted, and differences therebetween will be mainly described below.

The circuit board part 110 may include an insulating layer 120 and may further include a conductive pattern 130 configuring an interlayer circuit in various shapes and a conductive via hole 140 as shown in FIG. 5, as needed. The circuit board part 110 as described above may include the groove for receiving the multilayer ceramic capacitor therein.

The conductive via hole may be electrically connected to the external electrode of the multilayer ceramic capacitor received in the circuit board to supply power to the external electrode from the outside.

Figure 6:
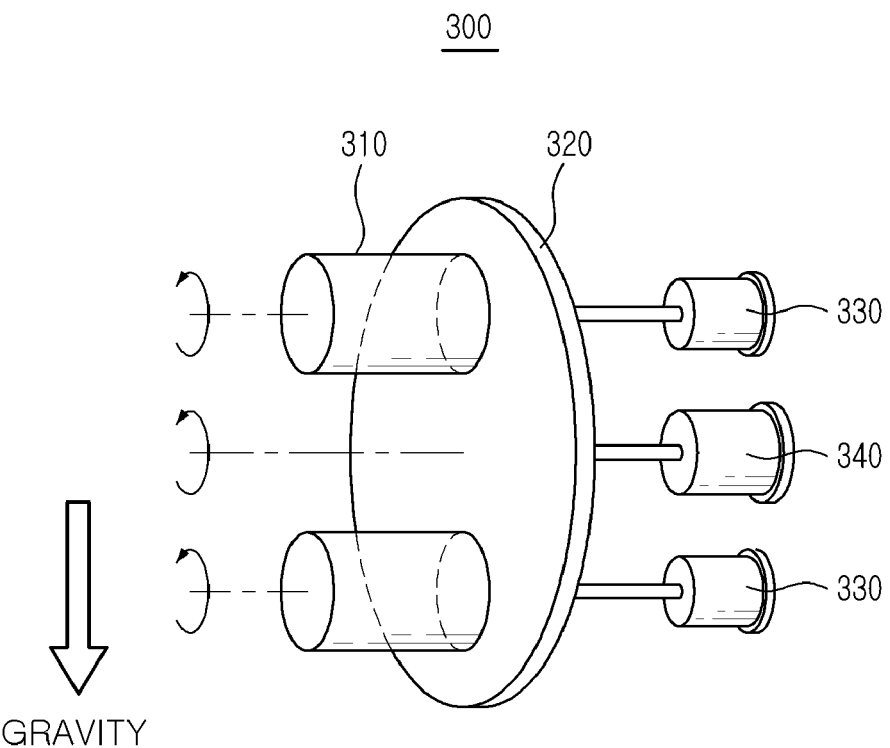
FIG. 6 is a perspective view showing a polishing device according to an embodiment of the present invention.

Polishing Device 300 for Multilayer Ceramic Capacitor and Polishing Method Therefor Referring to FIG. 6, according to an embodiment of the present invention, there is provided a polishing device 300 including polishing tanks 310; a revolving table 320; polishing tank rotation controlling parts 330, and a revolving table rotation controlling part 340.

FIG. 6 is a perspective view schematically showing the polishing device 300 according to the embodiment of the present invention.

The polishing tank 310 may receive work-pieces to be polished and a polishing element performing polishing, wherein the polishing element may be a ball.

The polishing tank 310 may revolve around a rotation axis of the revolving table 320 according to the rotation of the revolving table 320. For revolving of the polishing tank, the rotation axis of the revolving table may be formed at a position different from that of a rotation axis of the polishing tank. The polishing tank may rotate itself, separately from the revolving thereof due to the rotation of the revolving table. The polishing tank may rotate itself in such a manner that the polish tank rotates around the center thereof as the rotation axis present therein.

All of the rotation axes of the revolving table 320 and the polishing tank 310 may be formed at different positions to be in parallel to each other in a direction perpendicular to the direction of gravity. The reason is that in the case in which the rotation axes of the revolving table and the polishing tank are formed at the same position as each other, the revolving of the polishing tank may not be generated.

In the case of the existing polishing device in which a rotation axis of a revolving table and a rotation axis of a polishing tank are positioned in a direction parallel to the direction of gravity, centrifugal force acts in the direction perpendicular to the direction of gravity, and polishing elements or work-pieces in the polishing tank may be inclined toward a wall surface of the polishing tank due to the centrifugal force.

In this case, the polishing elements generally having high density are gathered at a lower portion of the polishing tank in the direction of gravity, and the work-pieces having low density are gathered at an relatively upper position of the polishing tank in the direction of gravity, such that separation between the polishing elements and the work-pieces may be generated according to the positions thereof. In the lower portion of the polishing tank in which a large number of polishing elements are present, the number of impacts between the work-pieces and the polishing elements may be high, such that the polishing may be excessively undertaken, while in the upper portion of the polishing tank in which a small number of the polishing elements are present, the number of impacts between the work-pieces and the polishing elements is small, such that the polishing may be insufficiently undertaken. That is, distribution of polishing states may be non-uniform.

In addition, when the work-piece rotates in a state in which the work-piece is attached to the wall surface of the polishing tank by centrifugal force, a non-uniform polishing phenomenon in which a surface of the work-piece attached to the wall surface of the polish tank is not polished may be generated.

The work-piece may be a 1005-sized ceramic body including a dielectric layer and a cover layer and having a thickness of 0.09 mm or less after firing. The ceramic body may include first and second internal electrodes disposed to face each other, while having the dielectric layer interposed therebetween. As the work-piece is approximately formed to a flat rectangular piece, the non-uniform polishing phenomenon is severely generated. That is, the thinner the thickness of the ceramic body, the more severe the non-uniform phenomenon.

However, in the case of the polishing device according to the present invention in which the rotation axes of the polishing tank and the revolving table are disposed in the direction perpendicular to the direction of gravity, a direction of centrifugal force and the direction of gravity may be parallel to each other, thereby preventing the work-piece from rotating while being attached to the wall surface of the polishing tank by centrifugal force. Therefore, a separation phenomenon between the work-piece and the polishing element may be decreased, and the non-uniform polishing phenomenon may be decreased.

In addition, when a speed of the rotation of the polishing tank 310 itself is defined as a rotational speed and a rotational speed of the revolving table 320 is defined as a revolution speed, rotational speed/revolution speed may be a rational number rather than a natural number.

In the case in which a ratio of the rotational speed to the revolution speed is an integer, polishing efficiency may be decreased. The reason is that in the casein which the ratio of the rotational speed to the revolution speed is an integer, mixing efficiency of the polishing element and the work-piece may be significantly decreased due to mismatch of the revolution and the rotation.

Experimental Example

The following Table 2 shows data obtained by examining abrasion degrees and chipping defects in the case of using an existing polishing device in which rotation axes of a revolving table and a polishing tank were disposed in a direction parallel to the direction of gravity (The related art method) and in the case of using a polishing device according to the embodiment of the present invention in which rotation axes of a revolution table and a polishing tank were disposed in a direction perpendicular to the direction of gravity (new method).

Ceramic bodies having a size of about 0.95 mm×0.47 mm (length×width (L×W), 1005 size) were used, and results were classified according to the thicknesses of the ceramic bodies. The polishing was performed under conditions in which the revolution speed of the revolving table was 150 RPM for 150 minutes, and the ratio of the rotational speed to the revolution speed was 1:1.3.

TABLE 2

| Polishing method | Ceramic body thickness (mm) | A-out ($\mu m^2$) | Chipping defects |
| --- | --- | --- | --- |
| The related art method | 0.5 | 139.5 | 0/1000 |
| The related art method | 0.3 | 77 | 0/1000 |
| The related art method | 0.25 | 51 | 0/1000 |
| The related art method | 0.09 | 6 | 340/1000 |
| The related | 0.08 | 5 | 521/1000 |

TABLE 2-continued

| Polishing method | Ceramic body thickness (mm) | A-out ($\mu m^2$) | Chipping defects |
|---|---|---|---|
| art method | | | |
| The related art method | 0.07 | 4 | 785/1000 |
| New method | 0.09 | 53 | 0/1000 |
| New method | 0.08 | 45 | 0/1000 |
| New method | 0.07 | 43 | 0/1000 |

Referring to Table 2, it may be appreciated that polishing was not properly performed, as thickness of the ceramic body is reduced. Particularly, it may be appreciated that in the related art method, when the thickness of the ceramic body is 0.09 mm or less, chipping defects were generated, but in the new method, even in the case in which the thickness of the ceramic body was 0.09 mm or less, the polishing was performed at a significant level, and chipping defects were not generated.

Therefore, it may be appreciated that in the polishing device according to the present invention to which the new method was applied, polishing efficiency was significantly improved as compared to the polishing device to which the related art method was applied.

The following Table 3 shows data indicating polishing results (A-out and chipping defects) according to the rotational speed/revolution speed.

Ceramic bodies having a size of about 0.95 mm×0.47 mm×0.09 mm (length×width×thickness (L×W×T), 1005 size) were used.

TABLE 3

| Sample | Rotational speed/revolution speed | Revolutions per minute (RPM) | Time (min) | A-out ($\mu m^2$) | Chipping defects |
|---|---|---|---|---|---|
| 1* | 1 | 100 | 100 | 0.2 | 325/1000 |
| 2* | 1 | 100 | 150 | 0.267 | 105/1000 |
| 3 | 1 | 100 | 200 | 0.3 | 0/1000 |
| 4* | 1 | 150 | 100 | 0.266 | 108/1000 |
| 5 | 1 | 150 | 150 | 0.433 | 0/1000 |
| 6 | 1 | 150 | 200 | 0.567 | 0/1000 |
| 7 | 1 | 200 | 100 | 0.4 | 0/1000 |
| 8 | 1 | 200 | 150 | 0.567 | 0/1000 |
| 9 | 1 | 200 | 200 | 0.7 | 0/1000 |
| 10 | 1.3 | 100 | 100 | 0.5 | 0/1000 |
| 11 | 1.3 | 100 | 150 | 1.233 | 0/1000 |
| 12 | 1.3 | 100 | 200 | 1.7 | 0/1000 |
| 13 | 1.3 | 150 | 100 | 0.833 | 0/1000 |
| 14 | 1.3 | 150 | 150 | 1.766 | 0/1000 |
| 15 | 1.3 | 150 | 200 | 2.733 | 0/1000 |
| 16 | 1.3 | 200 | 100 | 1.166 | 0/1000 |
| 17 | 1.3 | 200 | 150 | 2.133 | 0/1000 |
| 18 | 1.3 | 200 | 200 | 3.033 | 0/1000 |
| 19* | 2 | 100 | 100 | 0.267 | 101/1000 |
| 20 | 2 | 100 | 150 | 0.367 | 0/1000 |
| 21 | 2 | 100 | 200 | 0.433 | 0/1000 |
| 22* | 2 | 150 | 100 | 0.267 | 107/1000 |
| 23 | 2 | 150 | 150 | 0.467 | 0/1000 |
| 24 | 2 | 150 | 200 | 0.567 | 0/1000 |
| 25 | 2 | 200 | 100 | 0.367 | 0/1000 |
| 26 | 2 | 200 | 150 | 0.6 | 0/1000 |
| 27 | 2 | 200 | 200 | 0.767 | 0/1000 |

*indicates a Comparative Example.

As shown in Table 3, in the case in which rotational speed/revolution speed was an integer of 1 or 2, chipping defects were generated. Particularly, in the case in which rotational speed/revolution speed was 1, when polishing time was 150 minutes or less, a great number of chipping defects was generated, and in the case in which rotational speed/revolution speed was 2, when the polishing time is 100 minutes or less, chipping defects were generated. On the contrary, in the case in which rotational speed/revolution speed was 1.3, chipping defects were not generated at all. Therefore, it may be appreciated that it is preferable that rotational speed/revolution speed is not an integer.

According to the embodiment of the present invention, the polishing method and the polishing device for a multilayer ceramic capacitor, capable of having high polishing efficiency and decreasing the non-uniform polishing phenomenon may be provided.

Manufacturing Method for Multilayer Ceramic Capacitor

Figure 7:
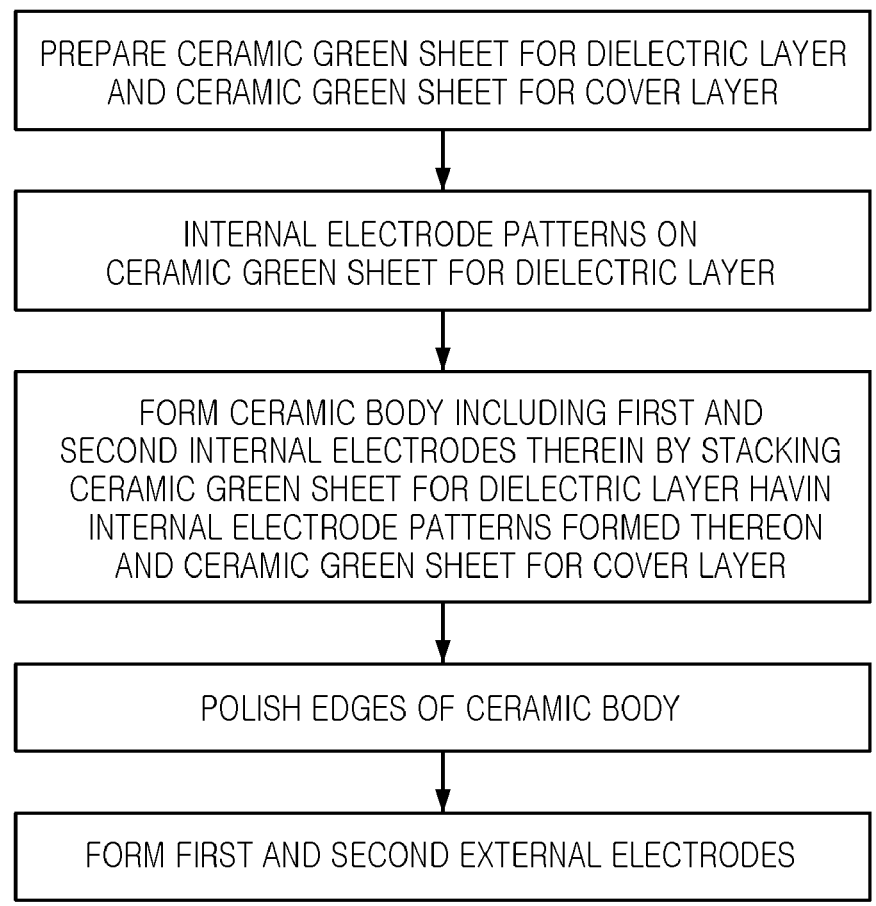
FIG. 7 is a view showing a manufacturing process of a multilayer ceramic capacitor according to an embodiment of the present invention.

FIG. 7 is a view showing a manufacturing process for a multilayer ceramic electronic component to be embedded in a board according to an embodiment of the present invention.

Referring to FIG. 7, the manufacturing method for a multilayer ceramic capacitor according to an embodiment of the present invention may include: preparing a ceramic green sheet for a dielectric layer and a ceramic green sheet for a cover layer; forming internal electrode patterns on the ceramic green sheet using a conductive paste for an internal electrode; forming a 1005-sized ceramic body including first and second internal electrodes disposed to face each other, a dielectric layer, and a cover layer therein, by stacking the ceramic green sheet having the internal electrode patterns formed thereon and the ceramic green sheet having no internal electrode patterns formed thereon and then firing the stacked ceramic green sheets; polishing edges of the ceramic body; and forming a first external electrode electrically connected to the first internal electrode and a second external electrode electrically connected to the second internal electrode.

Hereinafter, the manufacturing method for a multilayer ceramic electronic component according to the embodiment of the present invention will be described, but the present invention is not limited thereto.

In the manufacturing method for a multilayer ceramic electronic component according to the embodiment of the present invention, first, slurry containing powder such as a barium titanate ($BaTiO_3$)-based powder, or the like, was applied to carrier films and dried to prepare a plurality of ceramic green sheets, thereby forming the dielectric layer and the cover layer.

The ceramic green sheet may be manufactured by mixing the ceramic powder, a binder, and a solvent to prepare the slurry and manufacturing the prepared slurry in a sheet shape having a thickness of several µm by a doctor blade method.

Next, the conductive paste for an internal electrode containing nickel powder may be prepared.

After the conductive paste for an internal electrode is applied onto the green sheet by a screen printing method to form the internal electrode, several hundred layers of the green sheets on which the internal electrode is printed may be stacked, and several tens of layers of the green sheet on which the internal electrode is not printed may be stacked on upper and lower surfaces of the stacked body, followed by firing, thereby manufacturing the ceramic body 10. The ceramic body may include the internal electrode, the dielectric layer, and the cover layer, wherein the dielectric layer is formed by firing the green sheet on which the internal electrode is printed, and the cover layer is formed by firing the green sheet on which the internal electrode is not printed.

The ceramic body may have a thickness of 0.09 mm or less after firing.

Then, in a length-thickness (L-T) cross-section of the ceramic body, in the case in which the square A is defined as including sides parallel to the central portion of the first main surface 1 of the ceramic body, and vertices a and a' disposed in a diagonal direction on outer surfaces of the ceramic body, the sides having a length of 30 μm, when an area of a region of the square not occupied by the ceramic body is defined as A-out and a thickness of the cover layer is defined as t, polishing may be performed so that the following Equations are satisfied: 9 μm² ≤ A-out and A-out/t ≤ 3.7 μm.

The polishing may be performed using the polishing device as described above.

Since descriptions for the polishing device and method and the dimensions of the ceramic body are overlapped with the above-mentioned descriptions, the descriptions will be omitted.

Next, the first and second external electrodes containing a first conductive metal and glass may be formed on upper and lower surfaces and end surfaces of the ceramic body.

The first conductive metal is not particularly limited, but may be, for example, at least one selected from a group consisting of copper (Cu), silver (Ag), nickel (Ni), and alloys thereof.

The glass is not particularly limited, but may be a material having the same composition as that of glass used to manufacture an external electrode of a general multilayer ceramic capacitor.

As set forth above, according to the embodiments of the present invention, the multilayer ceramic capacitor to which the optimized dimensions for polishing the ceramic body may be applied in order to prevent chipping defects in which the ceramic body is damaged due to impacts between the ceramic bodies or between the ceramic body and other components and decrease capacitance defects due to the decrease in capacitance can be provided.

In addition, according to the present invention, the polishing method and the polishing device for a multilayer ceramic capacitor, capable of having high polishing efficiency and decreasing the non-uniform polishing phenomenon may be provided.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a 1005-sized ceramic body including a dielectric layer and a cover layer;
   first and second internal electrodes disposed to face each other, while having the dielectric layer interposed therebetween; and
   a first external electrode electrically connected to the first internal electrode and a second external electrode electrically connected to the second internal electrode,
   wherein in a length-thickness (L-T) cross-section of the ceramic body, in the case in which a square is defined as including sides parallel to a central portion of a first main surface of the ceramic body, and vertices disposed in a diagonal direction on outer surfaces of the ceramic body, the sides having a length of 30 μm, when an area of a region of the square not occupied by the ceramic body is defined as A-out and a thickness of the cover layer is defined as t, the following Equations are satisfied: 9 μm² ≤ A-out and A-out/t ≤ 3.7 μm.

2. The multilayer ceramic capacitor of claim 1, wherein the ceramic body has a thickness of 0.09 mm or less after firing.

3. The multilayer ceramic capacitor of claim 1, wherein the cover layer includes upper and lower cover layers, and the thickness t of the cover layer is an average of thicknesses of the upper and lower cover layers.

4. A circuit board having a multilayer ceramic capacitor embedded therein, the circuit board comprising:
   a circuit board part provided with a groove for receiving an electronic component; and
   a multilayer ceramic capacitor including a 1005-sized ceramic body including a dielectric layer and a cover layer; first and second internal electrodes disposed to face each other, while having the dielectric layer interposed therebetween; and a first external electrode electrically connected to the first internal electrode and a second external electrode electrically connected to the second internal electrode, and disposed in the groove,
   wherein in a length-thickness (L-T) cross-section of the ceramic body, in the case in which a square is defined as including sides parallel to a central portion of a first main surface of the ceramic body, and vertices disposed in a diagonal direction on outer surfaces of the ceramic body, the sides having a length of 30 μm, when an area of a region of the square not occupied by the ceramic body is defined as A-out and a thickness of the cover layer is defined as t, the following Equations are satisfied: 9 μm² ≤ A-out and A-out/t ≤ 3.7 μm.

5. A manufacturing method for a multilayer ceramic capacitor, the manufacturing method comprising:
   preparing ceramic green sheets;
   forming internal electrode patterns on the ceramic green sheets using a conductive paste for an internal electrode;
   forming a 1005-sized ceramic body including first and second internal electrodes disposed to face each other, a dielectric layer, and a cover layer therein, by stacking the ceramic green sheets having the internal electrode patterns formed thereon and the ceramic green sheets having no internal electrode patterns formed thereon, and then firing the stacked ceramic green sheets;
   polishing edges of the ceramic body; and
   forming a first external electrode electrically connected to the first internal electrode and a second external electrode electrically connected to the second internal electrode,
   wherein in a length-thickness (L-T) cross-section of the ceramic body, in the case in which a square is defined as including sides parallel to a central portion of a first main surface of the ceramic body, and vertices disposed in a diagonal direction on outer surfaces of the ceramic body, the sides having a length of 30 μm, when an area of a region of the square not occupied by the ceramic body is defined as A-out and a thickness of the cover layer is defined as t, the following Equations are satisfied: 9 μm² ≤ A-out and A-out/t ≤ 3.7 μm.

6. The manufacturing method of claim 5, wherein the ceramic body has a thickness of 0.09 mm or less after firing.

7. The manufacturing method of claim 5, wherein the cover layer includes upper and lower cover layers, and the thickness t of the cover layers is an average of thicknesses of the upper and lower cover layers.

* * * * *